Jan. 10, 1956   R. M. DOWNEY   2,729,861
APPARATUS AND METHOD FOR MAKING FIBROUS FELTS
Filed Nov. 1, 1951   2 Sheets-Sheet 1
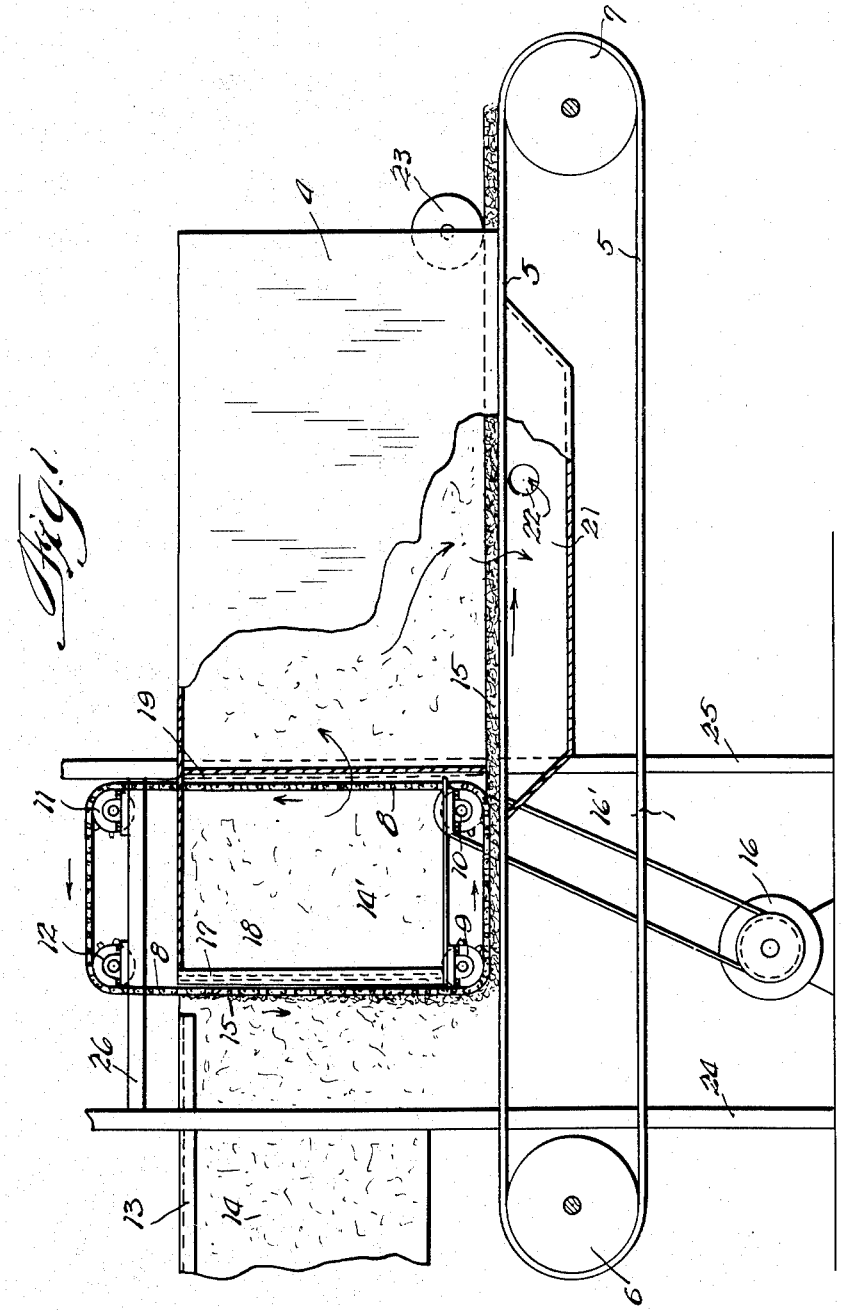
INVENTOR.
Richard M. Downey

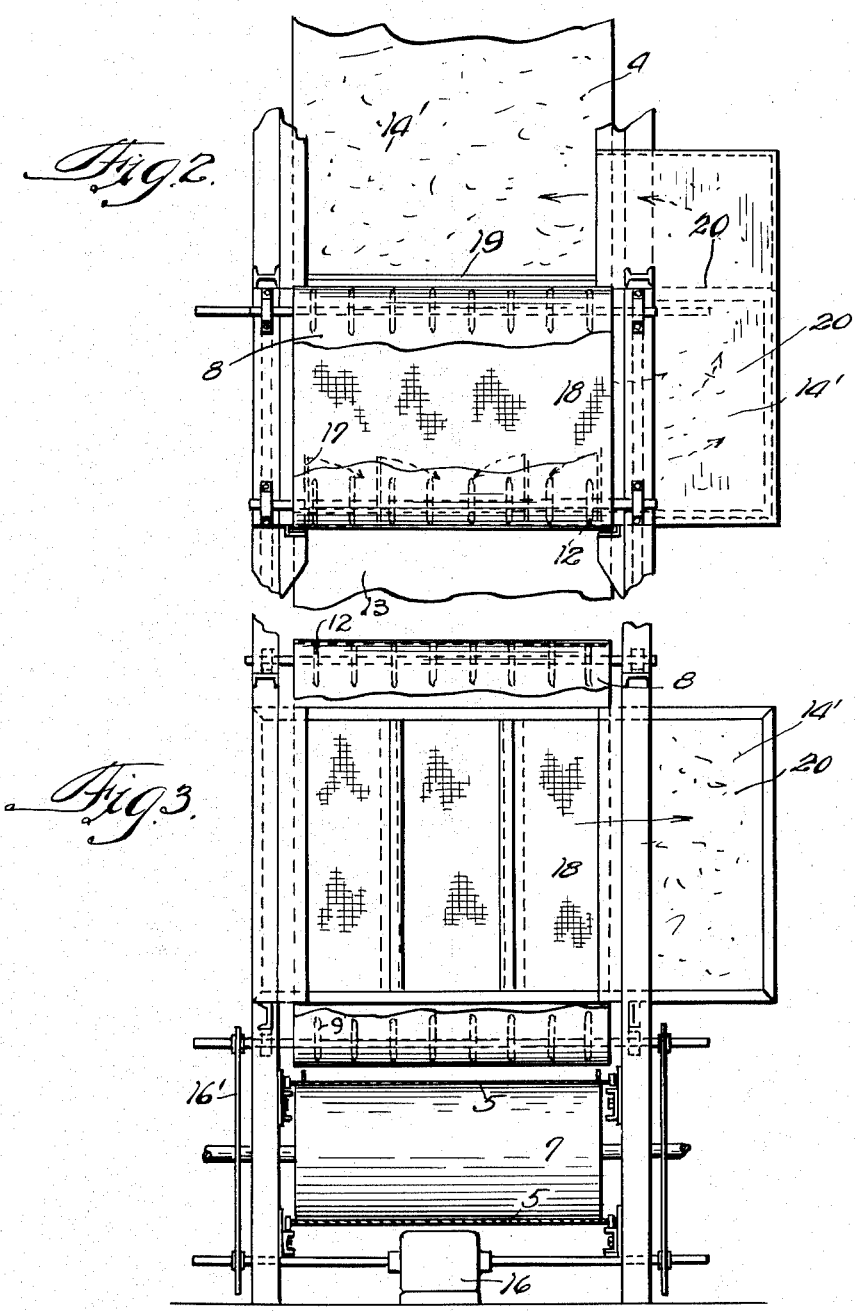

United States Patent Office 2,729,861
Patented Jan. 10, 1956

2,729,861

APPARATUS AND METHOD FOR MAKING FIBROUS FELTS

Richard M. Downey, North Judson, Ind., assignor to United States Gypsum Company, Chicago, Ill., a corporation of Illinois Application November 1, 1951, Serial No. 254,374

9 Claims. (Cl. 19—156)

The present invention relates to an improved apparatus and method for making fibrous felts or mats.

Fibrous felts, made for example of mineral fibers, are a well known manufacture, and many ways have been proposed for making them. It has usually been the custom to blow the fibrous material into what is termed a collecting chamber or blow room. The bottom of it is generally in the form of a traveling foraminous conveyor, upon which the fibers settle out in the form of a layer of fibers which may be slightly compressed to form a more or less coherent felt. In order to secure the desired adhesion, it was also customary to spray the fibers, prior to their collection, with suitable adhesive binders. Very often, however, such binders were omitted, especially when the felt was later to be broken up and granulated, as in the manufacture of certain types of acoustic tile, and for the making of pellet insulation such as may be poured or blown into hollow spaces in walls and between floors, and where the pelleted wool may be used as a packing material, as in shipping acid carboys, etc.

One of the difficulties which have been encountered in this art is the formation of what is known as "fly wool," which consists of loose fibers and small aggregations thereof which are caused by the unavoidable passage of some of the fibers, together with the air or other gas that carries them, through the foraminous conveyor. It has been the practice to exhaust the gas or air which passes through the conveyor, and to discharge it to the atmosphere. While many attempts have been made, as by means of baffles, centrifugal dust-separators, water-washing devices, and the like, to collect and entrap this fly-wool, some of it invariably escapes and is borne by the wind into the territory surrounding the plant where the felts are made, causing much annoyance and inconvenience. To avoid this therefore became a major problem in the large scale manufacture of fibrous felts, particularly such as are made of slag wool, mineral wool, rock wool, glass wool, and the like.

It is one of the objects of the present invention to provide an apparatus and method which will entrap the fly-wool from the plant making the fibrous felts.

It is another object of the present invention to filter the air or other gas which has passed through the main fiber-collecting instrumentality so as to remove the fly-wool, and to incorporate the latter into the felt itself which has been formed on the foraminous belt of the collection chamber or similar device employed in the plant.

It is a further object of the present invention to provide means for first forming an initial felt and then to use such felt as a continuous traveling filter by means of which to eliminate the fly-wool.

Other objects will become apparent from the further description hereinbelow, when considered in connection with the two sheets of drawings, which accompany the present specification, and in which:

Fig. 1 is a side elevation, partly in section, of the apparatus of the present invention, while Figs. 2 and 3 are, respectively, a top plan view and a front elevation of the same apparatus.

The invention is predicated upon the general principle of intercepting a gas-borne stream of fibrous materials, from whatever source it may be derived, upon a first foraminous conveyor, which may be traveling in a vertical direction, so that most of the fibers will be caught thereon to form an intial felt. As this felt gradually builds up as the conveyor travels along, it will be obvious that the layer first formed is quite thin, rapidly increasing in thickness as the conveyor travels further, so that the fibers first caught on the conveyor filter out the floating fibers more effectively. As a result of this, the first few feet of travel of the first conveyor will allow some of the gas-borne fibers to pass through it, and, unless means are provided to entrap them, such fibers would be exhausted from the apparatus. In accordance with the present invention, however, these gases which carry the as yet uncaught fibers, are caused to pass through the felt first formed, so that efficient filtration of the gases, with simultaneous catching of the fibers, will be effected. This is done, in the case of the present invention, by transferring the felt initially formed face down upon the main conveyor which forms the bottom of a suitable collecting chamber, and then passing the gases which have passed through the first conveyor through the formed felt from what had originally been the back thereof. As this entails the contact of the initially formed felt with conveyors on both sides thereof, a much smoother and more accurately dimensioned felt will result.

As shown in Fig. 1, there is shown a collecting chamber 4 the bottom of which is formed by a foraminous conveyor belt 5 which travels over the pulleys 6 and 7. An initial or primary conveyor 8, made of foraminous material, such as a wire belt or the like, runs over the pulleys 9, 10, 11 and 12, in the direction indicated by the arrows on the drawings. As seen in Figs. 2 and 3, there are a plurality of such pulleys for conveyor 8. This foraminous conveyor 8, for a portion of its travel, runs along parallel to the conveyor 5 but spaced therefrom a certain distance which is slightly greater than the thickness of the felt of mineral wool or other fibrous material which is to be produced.

A suitable throat or chute 13 serves as a passageway for gas-borne fibrous material 14, for instance mineral wool fibers, coming from a suitable means for producing the same, and the stream impinges against that portion of the conveyor 8 which is traveling downwardly, thereby starting to form a primary felt 15 which reaches its substantially final thickness at about the point where the conveyor 8 turns about the pulley 9 at which point the felt 15 thus formed is placed with its front face downwardly against the horizontally traveling conveyor 5, being conveyed between conveyors 8 and 5. Motive power for moving conveyors 8 is diagrammatically illustrated in the form of a prime mover 16 and suitable belting 16'. (The means for moving the conveyor 5, which runs at about the same speed as conveyor 8, are not shown, but are of the usual type employed in this industry.) The return travel of the conveyor 8 is in an upward direction passing first over the pulleys 10 then 11 and then 12 so as to resume its downward travel. Immediately behind the downwardly traveling portion of the conveyor 8 there are a series of deflecting louvers 17 which can be seen in Fig. 2, these being adjustable in the direction of the dotted arrows so that gas or air which flows through the vertical section of the conveyor 8 will be deflected upon entering the first chamber 18. In order to avoid having the air pass through the upwardly moving section of the conveyor 8 there may be provided a wall or partition 19. The gas or air which has flowed through the downwardly traveling section of the conveyor 8 into the chamber 18, leaves this chamber through a by-pass 20 and enters the said collecting chamber 4. The flow of these gases is indicated by the wavy arrows in Figs. 1 and 2.

This gas after passage through the downwardly traveling portion of the conveyor 8, still carries some air-borne fibers 14'. In order to remove these, the air or gas is passed in a reverse direction through the felt 15 on that section of the conveyor 5 which forms the bottom of the collecting chamber 4. The air or gas passing through the felt is vented into the exhaust chamber 21 which is provided with the exhaust port 22. The latter may be connected either to a suitable stack or chimney or to a suction fan or the like. By reason of the fact that the air or gas is thus compelled to pass through the freshly formed felt, any remaining or residual fibers will thus be deposited upon what had originally been the back of the felt, which term is intended to define that side of the felt which had been initially against the conveyor 8. Thus the felt while traveling on conveyor 5 has its original back upward and its original front downward against the conveyor 5.

As a result of the operation just described there will be no "fly-wool" in the gases or air which leaves the apparatus so that the gases may be safely discharged into the atmosphere without causing any annoyance in the neighborhood of the plant.

The utilization of the by-pass 20 in order to prevent the gases from passing a second time through the initial conveyor 8 greatly adds to the effectiveness of the apparatus. While the by-pass 20 is shown as being made substantially rectangular, it will be obvious that it could have any desired shape. By suitably adjusting the louvers or deflectors 17, an even deposit of fibers is assured.

With an apparatus constructed in accordance with the present invention, very rapid collection of fibrous felts is possible, and while the invention has been described primarily in connection with the making of mineral wool felt, it will be evident that it has wider applicability and may be used for the effective collection of any type of gas-borne fibrous material which may be cotton floc, asbestos, mineral wool, rock wool, glass wool, or their equivalents.

Primarily for this reason we have not illustrated the means for producing the gas-borne fibers as such means are thoroughly well known in the art.

It will of course also be ovbvious that binders and the like may be sprayed upon the fibers prior to their impingence upon the conveyor 8, and also that the further treatment of the formed felt 15 may involve passing of hot gases therethrough to set the binders, or the felt may have paper or other covering material applied thereto beyond the end of the conveyor 5.

The entire apparatus may be supported as indicated in the drawings on suitable angle iron supports 24, 25 and cross supports 26, and is preferably constructed of sheet metal such as sheet iron or steel, galvanized iron, corrugated aluminum sheeting, asbestos cement sheeting or the like, although when used for a collection of organic fibers where there is no heat involved, the apparatus could well be made of wood, plywood or the like.

Accordingly the drawings and description are to be considered as purely exemplificative, and not in any sense limiting.

I claim:

1. Apparatus for making mineral wool felt which comprises means for producing a horizontally traveling stream of gas-borne mineral wool fibers, a first foraminous conveyor having a vertically positioned downwardly traveling portion against which portion said stream impinges and upon which a felt of mineral wool initially collects while gas passes through said portion of the first conveyor, a horizontailly traveling second conveyor to which the felt thus produced is transferred from said first conveyor, means for passing gas which has passed through said vertical portion of said first conveyor through the transferred felt and thence through the second conveyor so as to filter out fibers carried by said gas, and means for exhausting the thus filtered gas to the atmosphere.

2. Apparatus for making mineral wool felt which comprises a chute for passage of an airborne stream of fibers, an intercepting foraminous conveyor for initially filtering said fibers out of said stream with the resultant formation of a fibrous felt; a second conveyor to which said felt is transferred, and means for causing air passing through said intercepting conveyor to pass first through said felt and then through said second conveyor to finally filter said air and to remove fibers therefrom and incorporate them with said felt.

3. Apparatus for making mineral wool felt which comprises the combination of two foraminous traveling conveyors operating for a portion of their travel in spaced parallel relationship and for other portions at a large angle to each other, one of said conveyors being arranged for deposition of mineral fibers thereon at a locus where it is at an angle to the other conveyor to eventuate a felt of fibers thereon which felt is then transferred to said second conveyor and travels while supported thereon; means for passing a gas through said first conveyor to form said felt and means for passing the gas after it has passed through the first conveyor through the formed felt while the latter is traveling on the second conveyor in a direction to pass first through said felt and then to exhaust through said second conveyor to the atmosphere.

4. Apparatus for making mineral wool felt which comprises means for producing a substantially horizontally moving stream of air-borne fibers, an intercepting foraminous conveyor having a vertical downwardly moving portion upon which said fibers will form a felt and through which air will pass carrying residual fibers which have escaped the felt-forming action, a second, substantially horizontally traveling conveyor arranged to receive said felt by transfer from the first conveyor with its exposed face against said second conveyor and conveying said felt with its former rear face upwardly; a collection chamber the bottom of which is formed by said second conveyor; a by-pass for gases which have passed through the first conveyor to convey them into said collection chamber, and a gas-exhaust duct under said second conveyor to effect exhaustion of said gases from said collection chamber.

5. Method of making fibrous felt which comprises the steps of filtering gas-borne fibers out of a stream of such fibers to form a felt and a current of residual gas which still carries some of the fibers, and passing said residual gas through the thus formed felt to filter out said still-carried fibers.

6. Method of making fibrous felt which comprises collecting mineral fibers as a felt on a foraminous surface from an air-borne stream of said fibers and passing air which has traversed said surface and hence has left a felt of said fibers thereon through the felt thus formed so as to filter residual fibers from said air.

7. Method of making fibrous felt which comprises initially forming a felt of fibers from a gas-borne stream thereof, with concomitant first filtration of said stream through an intercepting foraminous surface, and later filtering gas which has passed through said surface through the thus formed felt to eliminate any residual fibers still carried by said stream.

8. Method of forming mineral wool felt which comprises impinging a stream of gases carrying therein suspended mineral wool fibers against a foraminous conveyor to cause the collection thereon of said fibers as an initial felt having its rear surface in contact with said conveyor; transferring said initial felt from the first conveyor to a second conveyor with its original front surface in contact with the second conveyor, and passing the gases which have passed through the first conveyor through said initial felt from the rear surface to the front surface thereof while said felt is traveling on said second conveyor.

9. Method of making a fibrous felt which comprises creating a current of gas carrying suspended fibers therein; intercepting said current by means of a moving foraminous conveyor to form an initial felt of said fibers while permitting gas still containing some non-intercepted fibers therein to pass beyond said felt, and finally passing the gas current which contains said latter fibers through the initially formed felt from the side thereof which had contacted said conveyor, whereby to filter the previously non-intercepted fibers therefrom and thereby to incorporate them with the initial felt.

References Cited in the file of this patent

UNITED STATES PATENTS

| | | |
|---|---|---|
| 1,740,990 | MacKenzie | Dec. 24, 1929 |
| 2,057,369 | Curley | Oct. 13, 1936 |
| 2,152,901 | Manning | Apr. 4, 1939 |
| 2,206,297 | Curley et al. | July 2, 1940 |
| 2,271,793 | Curley et al. | Feb. 3, 1942 |
| 2,337,726 | Rainford et al. | Dec. 28, 1943 |
| 2,581,069 | Bertolet, Jr. | Jan. 1, 1952 |